US008425870B2

United States Patent
Wu et al.

(10) Patent No.: US 8,425,870 B2
(45) Date of Patent: Apr. 23, 2013

(54) REDUCTION OF CO AND $NO_x$ IN FULL BURN REGENERATOR FLUE GAS

(75) Inventors: Kuang-Tsai Wu, Williamsville, NY (US); Lee Rosen, Buffalo, NY (US); David Lenhert, Grand Island, NY (US); Christopher Leger, Houston, TX (US)

(73) Assignee: Praxair Technology, Inc., Danbury, CT (US)

( * ) Notice: Subject to any disclaimer, the term of this patent is extended or adjusted under 35 U.S.C. 154(b) by 88 days.

(21) Appl. No.: 13/102,340

(22) Filed: May 6, 2011

(65) Prior Publication Data

US 2011/0207063 A1    Aug. 25, 2011

Related U.S. Application Data

(62) Division of application No. 12/141,562, filed on Jun. 18, 2008, now Pat. No. 7,959,892.

(51) Int. Cl.
*B01D 53/14* (2006.01)
*C01B 21/00* (2006.01)
*C01B 13/00* (2006.01)

(52) U.S. Cl.
USPC .................. 423/246; 423/351; 423/579

(58) Field of Classification Search ............... None
See application file for complete search history.

(56) References Cited

U.S. PATENT DOCUMENTS

| | | | |
|---|---|---|---|
| 4,434,147 A | 2/1984 | Dimpfl et al. | |
| 4,519,993 A | 5/1985 | McGill et al. | |
| 4,692,318 A | 9/1987 | Tolpin et al. | |
| 4,812,430 A | 3/1989 | Child | |
| 5,240,690 A * | 8/1993 | Tang et al. | 423/236 |
| 5,266,024 A | 11/1993 | Anderson | |
| 5,372,706 A | 12/1994 | Buchanan et al. | |
| 5,382,352 A | 1/1995 | Hansen et al. | |
| 5,716,514 A | 2/1998 | Buchanan | |
| 5,830,346 A | 11/1998 | Harandi et al. | |
| 6,579,820 B2 | 6/2003 | Tamhankar et al. | |
| 6,776,607 B2 | 8/2004 | Nahas et al. | |
| 7,470,412 B2 | 12/2008 | Rosen et al. | |
| 7,959,792 B2 | 6/2011 | Vaarkamp et al. | |
| 2006/0233688 A1 | 10/2006 | Barckholtz et al. | |
| 2007/0140942 A1 * | 6/2007 | Rosen et al. | 423/235 |

* cited by examiner

*Primary Examiner* — Melvin C Mayes
*Assistant Examiner* — Sheng H Davis
(74) *Attorney, Agent, or Firm* — Donald T. Black

(57) ABSTRACT

A hot oxygen stream containing radicals is fed into a gas stream, such as a catalyst regenerator flue gas stream, that contains carbon monoxide to convert carbon monoxide to carbon dioxide.

8 Claims, 4 Drawing Sheets

REDUCTION OF CO AND NO$_x$ IN FULL BURN REGENERATOR FLUE GAS

This application is a division of, and claims priority from prior application Ser. No. 12/141,562, now U.S. Pat. No. 7,959,892 filed Jun. 18, 2008.

FIELD OF THE INVENTION

This invention relates to treatment of gas streams such as flue gases from catalyst regeneration units.

BACKGROUND OF THE INVENTION

Fluidized catalytic cracking (FCC) is a unit operation in which petroleum fractions of higher molecular weight are cracked into smaller molecules under heat and with a catalyst. During the cracking process, coke deposits form on the surface of the catalyst, necessitating regeneration of the catalyst. Therefore, the catalyst is continuously separated from the vapors generated by the cracking process and regenerated in a FCC regenerator where the coke deposits are burned off and the catalyst activity is restored.

The FCC regenerator can operate in two modes: full burn and partial burn. In the full burn mode, most of the carbon in the coke deposits is converted to $CO_2$ by reacting with oxygen in the oxidant stream that is also fed to the regenerator. When the regenerator is operated in the partial burn mode, the carbon reacts with oxygen in the oxidant stream and is converted to both CO and $CO_2$. In this instance, the CO in the regenerator flue gas is typically oxidized to $CO_2$ in a downstream boiler to recover heat from the CO oxidation and also to limit emissions of CO in the boiler flue gas. The CO boiler has air fired burners to create a hot flame zone that the regenerator flue gas has to pass through in which the CO is oxidized to $CO_2$. Refinery off-gas can be used as auxiliary fuel for the CO boiler burners. The heat released by the oxidation of CO and by the combustion of the refinery gas is recovered in the boiler to produce process steam.

The FCC regenerator flue gas also contains other species such as $SO_2$ and NOx. Typically, in the full burn mode some of the nitrogen in the carbon deposits is oxidized to NOx.

Some FCC systems have low temperature NOx and/or NOx/SOx removal devices. The low temperature NOx removal process normally requires a specified amount of gas residence time for achieving the desired NOx reduction efficiency. One problem associated with the FCC capacity increase is that the volume of the FCC regenerator flue gas may also increase. The increase of the regenerator flue gas volume shortens the gas residence time available for the downstream NOx removal devices and reduces their NOx reduction efficiency. The increase in the regenerator flue gas volume also promotes carryover of corrosive scrubbing fluid and increases the risk of accelerated corrosion after the scrubber.

Other processes that treat FCC regenerator flue gas differ from the present invention, but differ in significant conditions and do not provide the advantages that the present invention achieves. For instance, U.S. Pat. No. 5,240,690 teaches adding oxygen-containing gas to regenerator flue gas to produce an off gas having a temperature between 1000 F and 1600 F, but states that the objective is to increase the formation of NOx in the flue gas. U.S. Pat. No. 5,716,514 discloses a method in which carbon monoxide is preferentially not converted to carbon dioxide. U.S. Pat. No. 5,830,346 discloses a method that requires use of a catalyst for the conversion.

BRIEF SUMMARY OF THE INVENTION

In one aspect of the invention, a method for treating a regenerator flue gas stream comprises (A) providing from a catalyst regenerator a regenerator flue gas stream that contains carbon monoxide in a concentration less than 10,000 ppm and contains NOx in an amount up to 1,000 ppm;

(B) mixing fuel and oxygen and combusting a portion of the oxygen in the mixture with said fuel in a chamber to form a hot oxidant stream emerging from said chamber that contains oxygen, wherein the residence time of said combustion in said chamber is long enough that said hot oxidant stream has a temperature higher than the temperature of said regenerator flue gas and said residence time is short enough that said hot oxidant stream contains products of said combustion including radicals selected from the group consisting of radicals corresponding to the formulas O, H, OH, $C_2H$, $CH_2$, $C_jH_{2j+1}$ or $C_jH_{2j-1}$ wherein j is 1-4, and mixtures of two or more of such radicals;

(C) feeding the hot oxidant stream into the regenerator flue gas stream to raise the temperature of the regenerator flue gas to a temperature higher than 1100 F that is higher than the temperature of the flue gas stream to which the hot oxidant stream is added, wherein the hot oxidant stream is added at a rate sufficient to convert carbon monoxide in the regenerator flue gas to carbon dioxide.

Another aspect of the invention is a method for treating a gas stream comprising (A) providing from a catalyst regenerator a regenerator flue gas stream that contains carbon monoxide in a concentration less than 10,000 ppm and contains NOx in an amount up to 1,000 ppm;

(B) mixing fuel and oxygen and combusting a portion of the oxygen in the mixture with said fuel in a first chamber to form a hot oxidant stream emerging from said first chamber that contains oxygen, wherein the residence time of said combustion in said first chamber is long enough that said hot oxidant stream has a temperature higher than the temperature of said regenerator flue gas and said residence time is short enough that said hot oxidant stream contains products of said combustion including radicals selected from the group consisting of radicals corresponding to the formulas O, H, OH, $C_2H$, $CH_2$, $C_jH_{2j+1}$ or $C_jH_{2j-1}$ wherein j is 1-4, and mixtures of two or more of such radicals;

(C) feeding the first hot oxidant stream into the regenerator flue gas stream to raise the temperature of the regenerator flue gas to a temperature higher than the temperature of the flue gas stream to which the first hot oxidant stream is added, wherein the first hot oxidant stream is added at a rate sufficient to convert carbon monoxide in the regenerator flue gas to carbon dioxide;

(D) mixing fuel and oxygen and combusting a portion of the oxygen in the mixture with said fuel in a second chamber to form a second hot oxidant stream emerging from said second chamber that contains oxygen, wherein the residence time of said combustion in said second chamber is high enough that said second hot oxidant stream has a temperature that is higher than the temperature of the regenerator flue gas stream into which said second hot oxidant stream is fed in step (E) and said residence time is low enough that said second hot oxidant stream contains products of said combustion radicals selected from the group consisting of radicals corresponding to the formulas O, H, OH, $C_2H$, $CH_2$, $C_jH_{2j+1}$ or $C_jH_{2j-1}$ wherein j is 1-4, and mixtures of two or more of such radicals;

(E) feeding the second hot oxidant stream into the regenerator flue gas stream downstream from the first hot oxidant stream to raise the temperature of the regenerator flue gas to a temperature that is higher than the temperature of the flue gas stream to which the second hot oxidant stream is added, wherein the second hot oxidant stream is added at a rate sufficient to convert carbon monoxide in the regenerator flue gas to carbon dioxide.

Preferably, when the mixture is formed in step (C) catalyst is not added that would promote the conversion of the carbon monoxide or of the NOx.

As used herein, the term "NOx" means compounds of nitrogen and oxygen, and mixtures thereof, including but not limited to NO, $N_2O$, $NO_2$, $N_2O_4$, and mixtures thereof.

DETAILED DESCRIPTION OF THE INVENTION

While the following description of the present invention refers to the Figures, the invention is not to be considered to be confined to the embodiments illustrated in the Figures.

Figure 1:
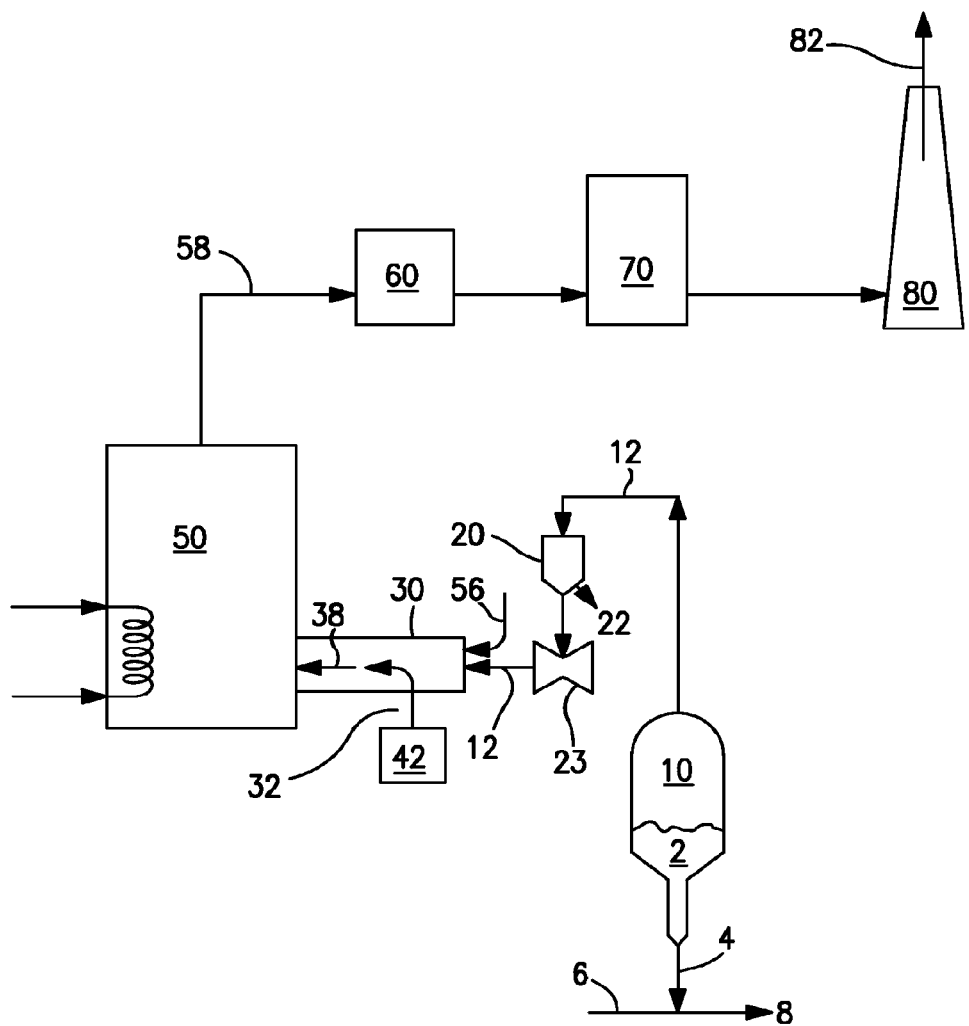
FIG. 1 is a flowsheet showing a typical catalyst regeneration system in which present invention can be practiced.

Referring to FIG. 1, a FCC regenerator (10) receives and regenerates used catalyst (2) from a FCC unit (not shown) and the regenerated catalyst (4) is mixed with a FCC feed stream (6) to form stream (8) which is transported back to the FCC unit. Regenerator flue gas stream (12) from regenerator (10) preferably passes through a device to remove entrained catalyst from the flue gas. One such device is cyclone separator (20), wherein fine catalyst carried over by the flue gas stream (12) is separated and discharged through a conduit (22). The regenerator flue gas stream (12) optionally but preferably goes through a power recovery turbine (23) to convert kinetic energy of the regenerator flue gas to readily usable power. After passing through the power recovery turbine, the regenerator flue gas stream (12) flows into and through a regenerator flue gas duct (30) or chamber, from which the flue gas (12) can pass into a downstream heat recovery unit (50) such as a heat exchanger.

As the FCC regenerator (10) is operated in the full burn mode, the regenerator flue gas stream (12) contains CO in an amount up to 5000 ppm and even up to 10,000 ppm, and contains NOx typically in amounts up to 200 ppm and even up to 1,000 ppm of NOx.

In any of these modes, the regenerator flue gas stream entering duct (30) typically has a temperature ranging from 900 F, or from 1000 F or 1100 F, and often up to 1600 F or up to 1800 F. The regenerator flue gas temperature can be up to 2600 F if appropriate measures are taken to accommodate such high temperatures, such as using refractory materials for the duct construction and/or incorporating a way to carry heat away such as a water wall in which heat passes through the duct wall and is carried away by a stream of water.

In the regenerator flue gas duct (30), or in any suitable chamber instead of a duct, a stream (32) of gaseous hot oxidant described further herein is fed at high momentum into the regenerator flue gas. The desired reaction of the hot oxygen with the regenerator flue gas is enhanced by increasing the intimacy of mixing between the hot oxygen and the flue gas. The intimate mixing can be promoted by dividing the hot oxygen into a plurality of streams and feeding these streams into the regenerator flue gas, or by feeding the hot oxygen across or countercurrent to the flue gas. Preferably, the intimate mixing is promoted by providing physical structure within duct or chamber (30) that promotes contact between the hot oxygen and the flue gas. Examples of such structure include wire mesh that the gases have to flow through, or baffles. The hot oxidant and the regenerator flue gas mix, during which the hot oxygen burns CO in the regenerator flue gas to $CO_2$ and may also convert at least some NOx present to environmentally benign $N_2$. The resulting gas mixture as stream (38) comprises the products of these reactions between the hot oxidant and the FCC regenerator flue gas and is available for further exploitation or for venting to the atmosphere.

If desired, optional separate oxidant stream 56 having an oxygen concentration of at least 20.9 vol. % at ambient temperature, or heated to above ambient temperature, can be fed into the regenerator flue gas upstream of where the hot oxidant stream is fed into the regenerator flue gas.

In a preferred manner of exploiting stream (38), it is fed to heat recovery unit (50) where it is cooled by indirect heat exchange to another process stream. The flue gas stream, now shown as stream (58), after any such heat exchange, flows to a particulate-removal unit (60) such as an electrostatic precipitator. The gas stream then passes through a unit (70) such as a scrubber or for additional emissions control and finally, the cleaned flue gas is sent to a stack (80) and emitted as stream (82) to the atmosphere. Other ways in which all or a portion of stream (38) can be exploited include using it as a feed stream for chemical process reactions, or combining it with another process stream for further treatment or use.

Figure 2:
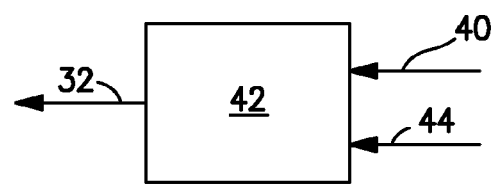
FIG. 2 is a schematic representation of a hot oxygen generator useful in the present invention.

To provide the high momentum hot oxygen stream (32), referring now to FIG. 2, stream (40) of oxidant having an oxygen concentration of at least 30 volume percent and preferably at least 85 volume percent is provided into a hot oxygen generator (42) which is preferably a chamber or duct which communicates with the regenerator flue gas duct or chamber through a suitable passageway from an opening in generator (42). Most preferably the oxidant (40) is technically pure oxygen having an oxygen concentration of 99.5 volume percent or more. The oxidant (40) fed to the hot oxygen generator has an initial velocity which is generally within the range of from 50 to 300 feet per second (fps) and typically will be less than 200 fps.

Stream (44) of fuel is provided to the hot oxygen generator (42) through a suitable fuel nozzle which may be any suitable nozzle generally used for fuel injection. The fuel may be any suitable combustible fluid examples of which include natural gas, methane, propane, hydrogen, refinery fuel gas, landfill offgas, syngas, carbon monoxide, and coke oven gas. The presence of hydrogen in the fuel fed to the hot oxygen generator (42) is advantageous in assisting conversion of CO to $CO_2$ evidently because the combustion that forms the hot oxygen stream promotes the formation of (nonionic) OH and O radicals in the hot oxygen stream. Preferably the fuel is a gaseous fuel. Liquid fuels such as number 2 fuel oil may also be used, although it would be harder to maintain good mixing and reliable and safe combustion with the oxidant with a liquid fuel than with a gaseous fuel.

The fuel (44) provided into the hot oxygen generator (42) combusts there with oxidant to produce heat and combustion reaction products such as carbon dioxide and water vapor. Preferably, no more than about 35 percent of the oxygen of the oxidant combusts with the fuel. If more than about 35 percent of the oxygen combusts with the fuel in the hot oxygen generator, then appropriate measures should be taken such as using refractory materials of construction and/or employing a heat removal feature such as a water wall to keep the temperature of the remaining oxygen from increasing to undesirable levels.

The combustion reaction products generated in the hot oxygen generator (42) may mix with some of the remaining oxygen of the oxidant (40), thus providing heat to some of the remaining oxygen and raising its temperature. Preferably, the fuel is provided into the hot oxygen generator (42) at a high velocity, typically greater than 200 fps and generally within the range of from 500 to 1500 fps. The high velocity serves to entrain oxidant into the combustion reaction products thus promoting combustion of the fuel in the chamber.

Generally the temperature of remaining oxidant within the oxidant supply duct is raised by at least about 500 F, and preferably by at least about 1000 F. It is preferred however that the temperature of the remaining oxidant not exceed about 3000 F to avoid overheating problems with supply ducts and nozzles.

As the temperature of the remaining oxygen within the hot oxygen generator (42) is increased, the requisite supply pressure of the oxidant to achieve any given oxidant injection velocity into the regenerator flue gas decreases. For example, for injection of the oxygen at ambient temperature the requisite pressure exceeds 7 pounds per square inch gauge (psig) in order to inject the oxygen into the regenerator flue gas at a velocity of 800 fps. As the oxygen temperature increases, the requisite pressure decreases sharply. At a temperature of 1500 F the requisite pressure is 1.65 psig and at a temperature of 3000 F the requisite pressure is only 0.91 psig. At temperatures exceeding 3000 F there is little additional benefit, thus providing another reason for not exceeding 35 percent oxygen combustion with the fuel. Thus, generation of hot oxygen in this manner can provide a high velocity hot oxygen stream (32) to the regenerator flue gas without the need for a high supply pressure thus reducing or eliminating the need for compressing oxidant prior to passing it into the regenerator flue gas which would otherwise be necessary if the oxidant source pressure is not high.

The combustion that occurs in hot oxygen generator (42) should be carried out in a manner such that the hot oxygen stream (32) that emerges from generator (42) contains one or more radicals corresponding to the formulas O, H, OH, $C_2H$, $CH_2$, $C_jH_{2j+1}$ or $C_jH_{2j-1}$ wherein j is 1-4, and mixtures of two or more of such radicals. This can be achieved by providing that the residence time of the reactants (fuel and oxygen) within hot oxygen generator (42) is long enough to enable combustion reaction of fuel and oxygen to occur in the hot oxygen generator (42) producing a stream having a temperature higher than the temperature of the regenerator flue gas into which the stream is to be fed, and simultaneously providing that said residence time is short enough that at least some of the above-mentioned radicals are present. The residence time, in turn, is determined by the volume of the space within generator (42), by the feed rates of fuel stream (44) and of oxidant stream (40) into generator (42), and by the size of the exit orifice through which the hot oxygen stream (32) emerges from generator (42). Preferred residence times are about 1 to 2 msec.

The hot oxygen stream (32) that is fed into the regenerator flue gas stream (12) may also lower the amount of NOx that is in the regenerator flue gas.

Figure 3:
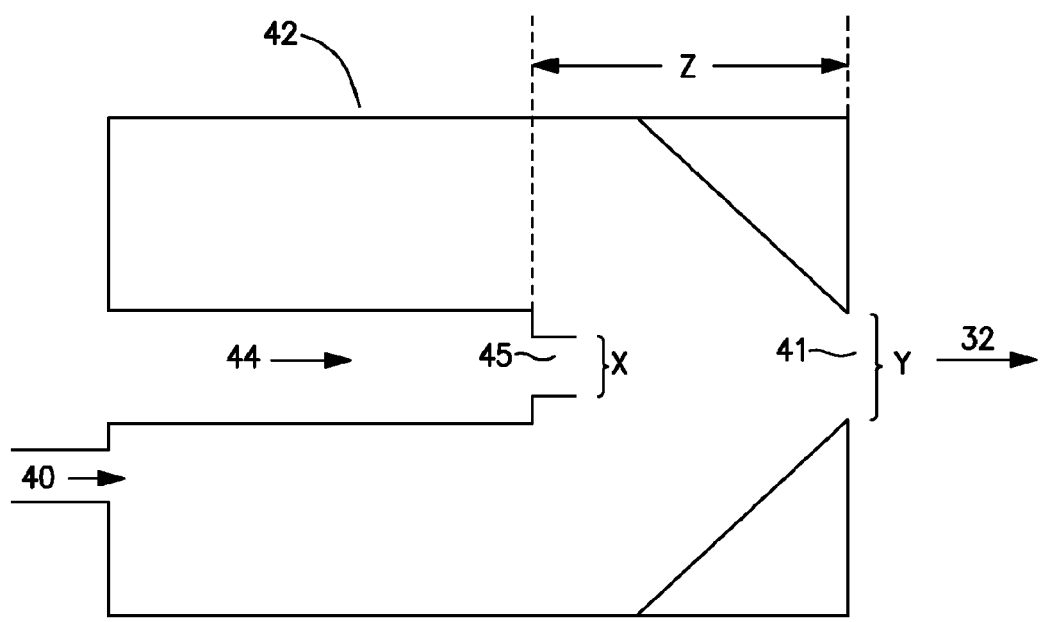
FIG. 3 is a cross-sectional view of a hot oxygen generator useful in the present invention.

Referring to FIG. 3, a cross-section of a hot oxygen generator (42) is shown. Fuel (44) emerges from orifice (45) whose diameter is "X". Oxygen stream (40) flows in front of orifice (45) and combusts with the fuel. The resulting hot oxygen stream (32) emerges from generator (42) through orifice (41), whose diameter is "Y". The distance from orifice (45) to orifice (41) is "Z". In general, the combination of the dimensions of a hot oxygen generator, the fuel and oxygen feed rates to that generator, and the exit orifice dimensions, that provide residence time which can produce a hot oxygen stream that has the desired temperature and the desired content of combustion radicals so as to reduce the CO content and reduce or maintain the NOx content of a flue gas stream into which the hot oxygen stream is fed, includes the following:
X: 0.3-1.0 mm
Y: 1.5-2.65 mm
Z: 1.0-3.5 inches
Fuel (natural gas) feed rate into the generator: 2-14 scfh
Oxygen feed rate into the generator: 16-72 scfh
Pressure within the generator: 15.1-67.8 psia The hot oxygen stream (32) preferably contains at least 75% (volume) $O_2$. A typical composition for this stream is about 80% $O_2$, 12% $H_2O$, 6% $CO_2$, some highly reactive radicals such as (nonionic) OH, O, and H which are particularly effective to initiate and oxidize CO to $CO_2$, and the aforementioned hydrocarbon radicals which promote reactions that lower the amount of NOx present. The hot oxygen stream (32) exits through orifice (41) and is fed to the regenerator flue gas at high velocity and momentum, which results in accelerated mixing between the hot gas and the FCC regenerator flue gas.

The hot oxygen stream (32) obtained in this way typically has a temperature of at least 1600 F and preferably at least 2000 F. Generally the velocity of the hot oxygen stream will be within the range of from 500 to 4500 feet per second (fps), preferably 800 to 2000 or to 2500 fps, and will exceed the initial velocity by at least 300 fps. In a preferred embodiment this velocity is at Mach 1.

The description in U.S. Pat. No. 5,266,024, the content of which is hereby incorporated herein by reference, further describes formation of the high momentum hot oxygen stream.

The high velocity hot oxygen stream is believed to entrain the FCC regenerator flue gas (12) through jet boundaries by velocity gradients or fluid shear, and by turbulent jet mixing. The gaseous stream that is formed upon combining the regenerator flue gas and the hot oxygen stream, which mixture may include reaction products of the hot oxygen and the regenerator flue gas, has a temperature of at least 1000 F, preferably at least 1250 F, although advantages can be realized when the temperature of this mixture is above 1400 F.

Figure 4:
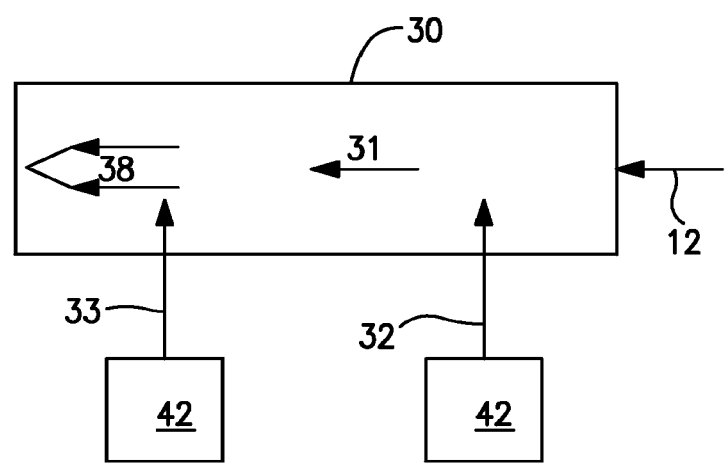
FIG. 4 is a flowsheet of a portion of an alternate embodiment of the present invention.

In other embodiments of the invention, two or more high momentum hot oxidant streams are fed into the regenerator flue gas stream. FIG. 4 illustrates one such embodiment. In FIG. 4, FCC regenerator flue gas stream (12) enters duct (30) where it mixes with a high momentum hot oxidant stream (32) formed and fed as described above with respect to stream (32) in FIG. 1. Part of the CO and NOx contained in the regenerator flue gas stream (12) are destroyed during this mixing, forming reacted mixture stream (31) into which a second high momentum hot oxidant stream (33) is fed and mixes. Stream (33) is formed and fed as described above with respect to stream (32), and has the same or different composition as stream (32). The second stream (33) mixes with the reacted mixture stream (31) and further lowers the amount of CO, and NOx in stream (31). The resulting mixture stream (38) can then be treated or used as described above.

In this embodiment, the conversion of CO in the regenerator flue gas to $CO_2$ will occur under less oxidizing conditions in multiple stages because the hot oxygen is supplied not all at once. Under this configuration, the NOx destruction reactions occur in longer residence times under these less oxidizing conditions because of the staged burnout of the CO. Therefore, higher destruction efficiencies of NOx are expected.

Figure 5:
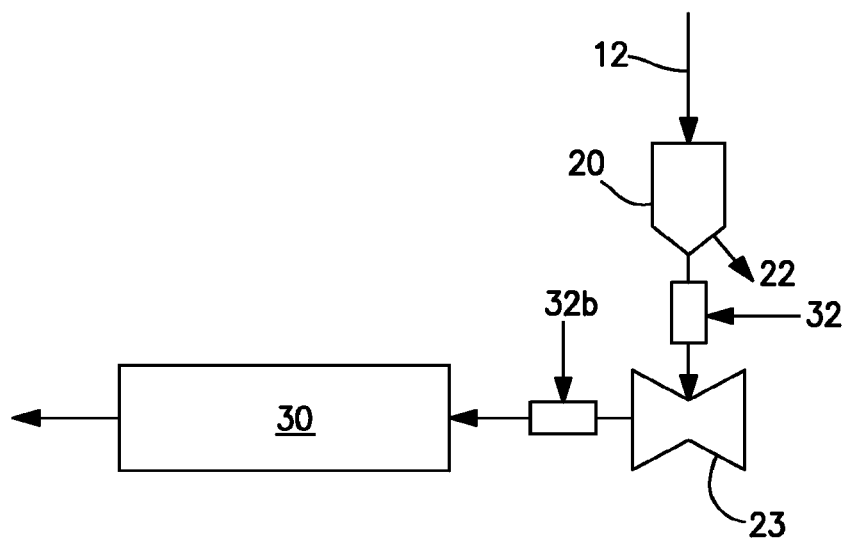
FIG. 5 is a flowsheet of yet another embodiment of the present invention.

FIG. 5 shows yet another embodiment of this invention. In FIG. 5, high momentum hot oxidant stream (32) is fed into the regenerator flue gas stream after cyclone separator (20) and upstream from power recovery turbine (23). In this embodiment, the heat provided by the hot oxygen and the heat released by the CO burnout can increase the regenerator flue gas temperature by 70 F to 90 F, before the gas stream enters the power recovery turbine (23). The feeding of the hot oxygen stream (32) for CO burnout also increases the total regenerator flue gas mass flow by about 0.6% to 2%. The increased mass flow and gas temperature would increase the output of the power recovery turbine due to the increase of the gas stream's momentum entering the turbine. The amount of the hot oxygen flow and the extent of the CO burnout can be controlled to meet the turbine's temperature limits.

Other combinations of configurations exist. For example, an optional second high momentum stream of hot oxidant (32b) could be fed after the turbine (23). In this case, the burnout of the CO is staged. The destruction efficiency of the NOx is expected to be higher. Also, two or more hot oxygen streams can be formed and fed in parallel into the regenerator flue gas.

When a carbon monoxide boiler is present, operational limits on the CO boiler are eased or removed. That is, the upstream FCC unit may operate at lower excess oxygen, for capacity increase, i.e., the feed rate to the FCC is increased while the air flow rate is kept at an allowable maximum. Under this operating condition, the FCC regenerator flue gas will contain more CO and may contain some NOx. However, this FCC regenerator flue gas will mix rapidly with the injected high-momentum hot oxygen for both CO burnout and NOx destruction. The amount of the hot oxygen injected can be tailored so that increased amounts of CO and NOx in the regenerator flue gas can be destroyed. In essence, this invention removes limitations imposed by the overall FCC regeneration operations in handling regenerator flue gas containing higher concentrations of CO and NOx. Thus, the invention allows existing FCC units to operate at higher capacities with little capital investment.

This invention is also surprising given that combustion reactions with oxygen and higher temperatures such as are employed herein are often associated with increased production of NOx beyond the levels of production encountered here. Also, the invention is expected to have the following unique and unobvious advantages:

The injection of the hot oxygen can have synergistic effect in boosting the output of a power recovery turbine. That is, when a high momentum, hot oxidant stream is fed into the regenerator flue gas stream upstream of the power recovery turbine, the heat provided by the hot oxygen and the heat released by the CO burnout can increase the regenerator flue gas temperature. The injection of the hot oxygen for CO burnout also increases the total regenerator flue gas mass flow. The increased mass flow and gas temperature would increase the output of the power recovery turbine due to the increase of the gas stream's momentum entering the turbine.

Also, consumption of CO combustion promoters in the regenerator is reduced or eliminated. That is, many FCC regenerators use platinum-based CO combustion promoters to accelerate CO burnout for controlling CO afterburn. It has been reported that the use of the platinum-based combustion promoters increases NOx concentration in the regenerator flue gas. Hence, the amount of CO reduction must be balanced with the maximum amount of NOx allowed, through the amount of combustion promoters used in the regenerator bed. The combustion promoters may not be reclaimed entirely so there are economic losses associated with the loss of the expensive combustion promoters. If a high momentum hot oxygen stream is fed into the regenerator flue gas stream as described herein, the amount of these combustion promoters in use may be reduced. This is because the hot oxygen can destroy the CO in the downstream regenerator flue gas. The reduced consumption of combustion promoters will in turn decrease the amount of unrecoverable promoters thus reducing the operating costs of a FCC unit.

The invention is further illustrated in the following example.

EXAMPLE

Various gas mixtures, representing simulated flue gases, were prepared and a hot oxygen stream was generated and fed into the gas mixtures under various conditions. Table 1 below sets forth the temperature, the CO concentration, the concentration of nitrogen oxides, the oxygen concentration, and the carbon dioxide concentration, for each gas mixture tested, both before and after a hot oxygen stream was fed into the gas mixture. Each gas mixture into which a hot oxygen stream was fed contained 9 vol. % H2O, 11 vol. % CO2, 80 vol. % N2, as well as CO and NOx in the concentrations stated in Table 1. Several different exit nozzles of the hot oxygen generator were tested as well. Table 1 also indicates which nozzle was used in each test. Table 2 indicates the range of operating conditions and the different exit nozzle sizes for the hot oxygen generator.

TABLE 1

Test Results

| | Flue gas in: | | | | | Nozzle type | Flue gas out: | | | | | NOx |
|---|---|---|---|---|---|---|---|---|---|---|---|---|
| Case No. | Temperature (F.) | CO (ppm) | NOx (ppm) | O2 (%) | CO2 (%) | [—] [—] | Temperature (F.) | CO (ppm) | NOx (ppm) | O2 (%) | CO2 (%) | CO change % | change % |
| 1 | 1202 | 4636 | 27 | 0 | 10.0 | A | 1373 | 73 | 40 | 1.41 | 11.1 | −98.4 | 46.5 |
| 2 | 1204 | 4171 | 27 | 0 | 10.3 | B | 1369 | 85 | 32 | 1.39 | 11.3 | −98.0 | 15.8 |
| 3 | 1201 | 3760 | 26 | 0 | 10.1 | C | 1299 | 397 | 28 | 0.95 | 10.9 | −89.4 | 5.4 |
| 4 | 1203 | 4166 | 30 | 0 | 10.7 | D | 1331 | 171 | 33 | 1.21 | 11.6 | −95.9 | 10.5 |
| 5 | 1204 | 3908 | 28 | 0 | 10.2 | E | 1366 | 61 | 29 | 0.75 | 11.3 | −98.4 | 2.9 |
| 6 | 1255 | 4109 | 39 | 0 | 10.1 | A | 1370 | 45 | 49 | 1.15 | 11.0 | −98.9 | 27.1 |
| 7 | 1255 | 4371 | 36 | 0 | 10.1 | B | 1374 | 68 | 35 | 2.30 | 11.0 | −98.4 | 2.8 |
| 8 | 1253 | 4076 | 36 | 0 | 10.2 | E | 1372 | 68 | 31 | 2.28 | 11.0 | −98.3 | −12.9 |

TABLE 1-continued

Test Results

| Case No. | Flue gas in: | | | | | Nozzle type | Flue gas out: | | | | | NOx change % |
| --- | --- | --- | --- | --- | --- | --- | --- | --- | --- | --- | --- | --- |
| | Temperature (F.) | CO (ppm) | NOx (ppm) | O2 (%) | CO2 (%) | [—] [—] | Temperature (F.) | CO (ppm) | NOx (ppm) | O2 (%) | CO2 (%) | CO change % |
| 9 | 1249 | 4582 | 120 | 0 | 10.7 | E | 1385 | 38 | 109 | 1.25 | 11.6 | −99.2 | −8.7 |
| 10 | 1248 | 548 | 124 | 0 | 10.2 | E | 1330 | 59 | 117 | 1.45 | 10.6 | −89.2 | −5.8 |
| 11 | 1308 | 3645 | 35 | 0 | 10.5 | C | 1385 | 80 | 58 | 2.70 | 11.1 | −97.8 | 65.5 |
| 12 | 1407 | 3822 | 64 | 0 | 10.9 | E | 1429 | 21 | 60 | 0.91 | 11.5 | −99.5 | −6.4 |

Gas compositions listed in the table are based on dry gaseous volume.

TABLE 2

Hot-Oxygen Generator Operating Conditions and Dimensions

| Case No. | Fuel flow (scfh) | Oxygen flow (scfh) | Pressure (psia) | Nozzle Type [—] | (Ref. to FIG. 3 for definition) | | |
| --- | --- | --- | --- | --- | --- | --- | --- |
| | | | | | X (mm) | Y (mm) | Z (inches) |
| 1 | 11.9 | 47.8 | 15.2 | A | 1.01 | 5.00 | 1.04 |
| 2 | 12.0 | 48.1 | 15.3 | B | 1.01 | 5.00 | 2.04 |
| 3 | 7.9 | 32.3 | 40.9 | C | 0.31 | 1.50 | 1.29 |
| 4 | 9.9 | 39.8 | 20.8 | D | 1.01 | 2.65 | 2.54 |
| 5 | 12.1 | 36.0 | 19.1 | E | 1.01 | 2.65 | 1.29 |
| 6 | 9.0 | 36.1 | 15.1 | A | 1.01 | 5.00 | 1.04 |
| 7 | 10.0 | 59.9 | 15.4 | B | 1.01 | 5.00 | 2.04 |
| 8 | 10.0 | 59.9 | 20.8 | E | 1.01 | 2.65 | 1.29 |
| 9 | 12.2 | 48.7 | 20.4 | E | 1.01 | 2.65 | 1.29 |
| 10 | 12.1 | 48.2 | 20.2 | E | 1.01 | 2.65 | 1.29 |
| 11 | 5.6 | 59.2 | 67.8 | C | 0.31 | 1.50 | 1.29 |
| 12 | 5.0 | 30.6 | 16.7 | E | 1.01 | 2.66 | 1.29 |

The total flue gas flow used in the example experiment was approximately 2200 scfh. Fuel flow to the hot oxygen generator varied in a range between 5.0 scfh to 12.2 scfh, and the corresponding oxygen flow to the hot oxygen generator changed between 30.6 scfh to 60.0 scfh. Fuel nozzle size varied between 0.3 mm to 1.0 mm for the five nozzles indicated in Table 1, and the size of the exit hot oxygen nozzle varied between 1.5 mm to 5 mm. The fuel nozzle was recessed from the oxygen nozzle at a distance between 1.04 inches to 2.54 inches. The operating pressure of the hot oxygen generator was between 15.1 psia to 67.8 psia.

The temperature of the regenerator flue gas for Case 1 was 1202 F, and a nozzle design "A" was selected for the hot oxygen generator. Before the hot oxygen injection, the flue gas contained 4636 ppm of CO, 27 ppm of NOx, little or no oxygen, and 10% of CO2. Downstream after the hot oxygen injection, the temperature of the flue increased to 1373 F because the injected oxygen was hot and also due to the release of the chemical heat from CO oxidation to CO2. CO reduced to 73 ppm (i.e., a 98.4% reduction) and in this case NOx increased to 40 ppm (i.e., a 46.5% increase). The excess oxygen was 1.41% after the hot oxygen injection.

Cases 2 to 5 used different nozzle designs (i.e., nozzles "B", "C", "D", and "E", respectively) to reduce CO, while attempting to keep the flue gas temperatures and CO concentrations before the hot oxygen injection as close as possible to those values of the Case 1. It can be seen that nozzle "E" of Case 5 was a better design for the application, because it destroyed CO from 3908 ppm to 61 ppm, while at the same time keeping the NOx level almost constant from 28 ppm at the inlet to 29 ppm at the outlet.

Cases 6 to 10 were carried out at higher flue gas inlet temperatures between 1248 F to 1255 F. Nozzle "E" was shown, again, to have the best NOx performance. For instance, Case 8 demonstrated that nozzle "E" reduced CO from 4076 ppm to 68 ppm, while simultaneously minimized the flue gas NOx from 36 ppm to 31 ppm. The NOx reduction capability of nozzle "E" was further confirmed in Cases 9 and 10 where flue gas inlet NOx and inlet CO concentrations were varied. In Case 9 NOx concentration at the flue gas inlet was higher at 120 ppm, and in Case 10 CO concentration at the flue gas inlet was lower at 548 ppm. In both Cases, the hot oxygen streams from nozzle "E" destroyed the flue gas inlet CO and simultaneously reduced the inlet NOx by 8.7% and 5.8%, respectively.

Cases 11 and 12 were carried out at inlet flue gas temperatures even higher at 1308 F and 1407 F, respectively. In Case 11, nozzle "C" was used but NOx increased from 35 ppm before the hot oxygen injection to 58 ppm after the injection. The NOx reduction ability of nozzle "E" was demonstrated again in Case 12, where the inlet flue gas temperature was the highest at 1407 F. It can be seen that nozzle "E" of Case 12 destroyed CO from 3822 ppm to 21 ppm, while at the same time reduced the NOx from 64 ppm at the inlet to 60 ppm at the outlet.

What is claimed is:

1. A method for treating a gas stream comprising
   (A) providing a gas stream that contains water vapor, carbon dioxide, N2, carbon monoxide in a concentration less than 10,000 ppm, and NOx in an amount of up to 1,000 ppm;
   (B) mixing fuel and oxygen and combusting a portion of the oxygen in the mixture with said fuel in a chamber to form a hot oxidant stream emerging from said chamber that contains oxygen, wherein the residence time of said combustion in said chamber is 1-2 msec and long enough that said hot oxidant stream has a temperature higher than the temperature of said gas stream and said residence time is short enough that said hot oxidant stream contains products of said combustion including radicals selected from the group consisting of radicals corresponding to the formulas O, H, OH, C2H, CH2, CjH2j+1 or CjH2j−1 wherein j is 1-4, and mixtures of two or more of such radicals;
   (C) feeding the hot oxidant stream into the gas stream provided in step (A) to raise the temperature of said gas to a temperature higher than 1100 F that is higher than the temperature of the gas stream to which the hot oxidant stream is added, wherein the hot oxidant stream is added at a rate sufficient to convert carbon monoxide in the gas to carbon dioxide.

2. A method according to claim 1 wherein the temperature of the gas stream that is provided in step (A) is up to 1800 F.

3. A method according to claim 1 wherein the stream that is formed in step (C) by feeding the hot oxidant stream into gas stream provided in step (A) has a temperature of at least 1250 F.

4. A method according to claim 1 wherein the stream that is formed in step (C) by feeding the hot oxidant stream into the gas stream provided in step (A) has a temperature of at least 1400 F.

5. A method according to claim 1 wherein no more than 35% of the oxygen mixed with fuel in step (B) is combusted in step (B).

6. A method according to claim 1 wherein the hot oxidant stream formed in step (B) is fed into the gas stream in step (C) at a velocity of at least 500 feet per second.

7. A method according to claim 1 wherein the hot oxidant stream formed in step (B) is fed into the gas stream in step (C) at a velocity of Mach 1.

8. A method according to claim 1 wherein NOx in the gas stream is converted to N2 thereby producing a product stream wherein the amount of NOx in the product stream following said conversion is not greater than the amount of NOx in said gas stream before said mixture is formed.

\* \* \* \* \*